US009102177B2

(12) United States Patent
Iida et al.

(10) Patent No.: US 9,102,177 B2
(45) Date of Patent: Aug. 11, 2015

(54) PRINTING DEVICE FOR PRINTING FROM STORED PRINT DATA

(75) Inventors: Yuji Iida, Chita (JP); Yoshihiko Sugimura, Nagoya (JP); Junya Kawai, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 41 days.

(21) Appl. No.: 13/546,721

(22) Filed: Jul. 11, 2012

(65) Prior Publication Data

US 2013/0016149 A1 Jan. 17, 2013

(30) Foreign Application Priority Data

Jul. 12, 2011 (JP) ................................ 2011-153560

(51) Int. Cl.

| | |
|---|---|
| ***G06K 15/02*** | (2006.01) |
| ***B41J 11/42*** | (2006.01) |
| ***B41J 2/21*** | (2006.01) |
| ***B41J 11/00*** | (2006.01) |
| *B41J 3/407* | (2006.01) |

(52) U.S. Cl.

CPC ................ *B41J 11/42* (2013.01); *B41J 2/2146* (2013.01); *B41J 11/008* (2013.01); *B41J 3/4075* (2013.01)

(58) Field of Classification Search

CPC .............. G06K 15/02; G06K 15/1886; G06K 15/1817; G06K 15/1806; G06K 15/4095; G06K 15/00; G06K 15/005; G06K 15/1803; G06K 15/1809; G06K 15/1822; G06K 15/1849; G06K 15/1889; G06K 15/402; G06K 15/4045

See application file for complete search history.

(56) References Cited

U.S. PATENT DOCUMENTS

| | | | | |
|---|---|---|---|---|
| 5,226,116 | A * | 7/1993 | Sasaki | 345/467 |
| 7,992,791 | B2 | 8/2011 | Fukui et al. | |
| 2004/0196353 | A1 * | 10/2004 | Hosokawa et al. | 347/191 |
| 2009/0082479 | A1 | 3/2009 | Cho | |

FOREIGN PATENT DOCUMENTS

| | | | |
|---|---|---|---|
| JP | 11-203063 | A | 7/1999 |
| JP | 2003-341184 | A | 12/2003 |

(Continued)

OTHER PUBLICATIONS

Extended European Search Report issued in European Application No. 12175906.2 on Jan. 2, 2013.

(Continued)

*Primary Examiner* — King Poon
*Assistant Examiner* — Andrew H Lam
(74) *Attorney, Agent, or Firm* — McCarter & English, LLP

(57) ABSTRACT

A printing device includes a feeding portion configured to feed a print medium along a feed direction, a printing portion configured to perform printing on the print medium fed by the feeding portion, the printing being performed for each of a print line extending in a direction orthogonal to the feed direction, a storage portion configured to sequentially store print data received from the external device, and a processor configured to determine whether consecutive identical data are accumulated in the storage portion, the consecutive identical data being identical print data for a predetermined number of the print lines that are consecutive in the feed direction, and cause the printing portion to start the printing based on the print data stored in the storage portion when it is determined that the consecutive identical data are accumulated.

6 Claims, 5 Drawing Sheets

(56) References Cited

FOREIGN PATENT DOCUMENTS

| | | | | |
|---|---|---|---|---|
| JP | 2007-190838 | A | | 8/2007 |
| JP | 2007-326307 | A | | 12/2007 |
| JP | 2009-073731 | A | | 4/2009 |
| JP | 2009073131 | A | * | 4/2009 |
| JP | 2009073131 | A | * | 4/2009 |

OTHER PUBLICATIONS

Chinese Office Action issued in Chinese Application No. 201210230424.8 on Apr. 25, 2014.

Second Office Action for Chinese Patent Application No. 201210230424.8 issued by the State Intellectual Property Office of the People's Republic of China on Feb. 28, 2015.

* cited by examiner

PRINTING DEVICE FOR PRINTING FROM STORED PRINT DATA

CROSS-REFERENCE TO RELATED APPLICATION

This application claims priority to Japanese Patent Application No. 2011-153560 filed on Jul. 12, 2011, the disclosure of which is herein incorporated by reference in its entirety.

BACKGROUND

The present invention relates to a printing device that performs printing based on data for the printing that are transmitted from an external device, and also relates to a non-transitory computer readable medium storing a printing control program.

A printing device is widely used that can be connected to a plurality of external devices, such as personal computers, via a network or the like and that performs printing according to print data transmitted from the external devices. As this type of printing device, a printing device is known that can perform so-called successive printing in order to start the printing swiftly. The successive printing is a printing mode in which the printing is sequentially performed on a print medium based on data received, while at the same time receiving the print data from the external device. An amount of the received data may become less than an amount required for the successive printing, if it takes too long to receive the data from the external device, due to a delayed transmission of the data, for example. In such a case, the printing device may temporarily stop the printing, and restart the printing afterwards, when the amount of the received data accumulated becomes equal to or more than the required amount.

SUMMARY

The above-described printing device maintains print quality by performing so-called link printing, in which a section printed immediately before stopping the printing is reprinted, when restarting the printing. However, in order to perform the reprinting of the section previously printed once, it is necessary to once move back a print medium in an opposite direction to a normal feed direction and then to feed the print medium in the normal feed direction again. Therefore, there is a possibility that the print quality deteriorates as a result of a slight misalignment of the reprinted section.

Various exemplary embodiments of the general principles described herein provide a printing device that is capable of inhibiting deterioration in print quality when printing is performed while receiving data for the printing from an external device.

The exemplary embodiments described herein provide a printing device that is connectable to an external device and that includes a feeding portion, a printing portion, a storage portion, and a processor. The feeding portion is configured to feed a print medium along a feed direction. The printing portion is configured to perform printing on the print medium that is fed by the feeding portion, the printing being performed for each of a print line extending in a direction orthogonal to the feed direction. The storage portion is configured to sequentially store print data received from the external device. The processor is configured to determine whether consecutive identical data, which are identical print data for a predetermined number of the print lines that are consecutive in the feed direction, are accumulated in the storage portion, and cause the printing portion to start the printing based on the print data stored in the storage portion when it is determined that the consecutive identical data are accumulated.

The exemplary embodiments described herein also provide a non-transitory computer readable medium storing a printing control program. The printing control program includes computer readable instructions that, when executed, cause a processor of a printing device that is connectable to an external device to perform the steps of determining whether consecutive identical data are accumulated in a storage portion that is adapted to sequentially store print data received from the external device, and causing the printing portion to start the printing based on the print data stored in the storage portion when it is determined that the consecutive identical data are accumulated. The consecutive identical data are identical data for a predetermined number of print lines that are consecutive in a feed direction, which is a direction in which a print medium is fed by a feeding portion of the printing device. The print line is a unit in which printing is performed by a printing portion of the printing device on the print medium that is fed by the feeding portion and extends in a direction orthogonal to the feed direction.

BRIEF DESCRIPTION OF THE DRAWINGS

Exemplary embodiments of the present disclosure will be described below in detail with reference to the accompanying drawings in which.

DETAILED DESCRIPTION

An embodiment of the present invention will be explained below with reference to the drawings.

Figure 1:
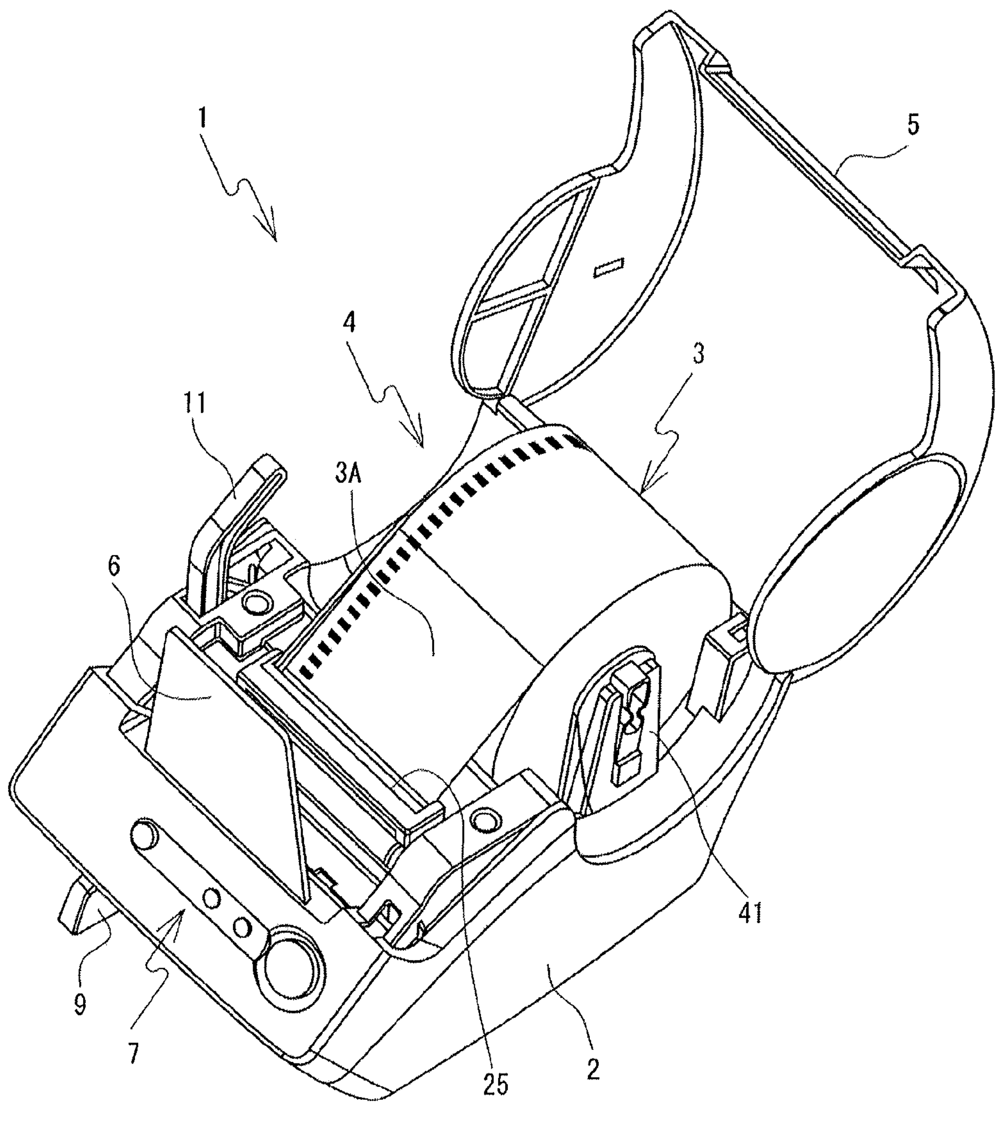
FIG. 1 is a perspective view of a printing device 1 with a cover 5 in an open position.
Figure 2:
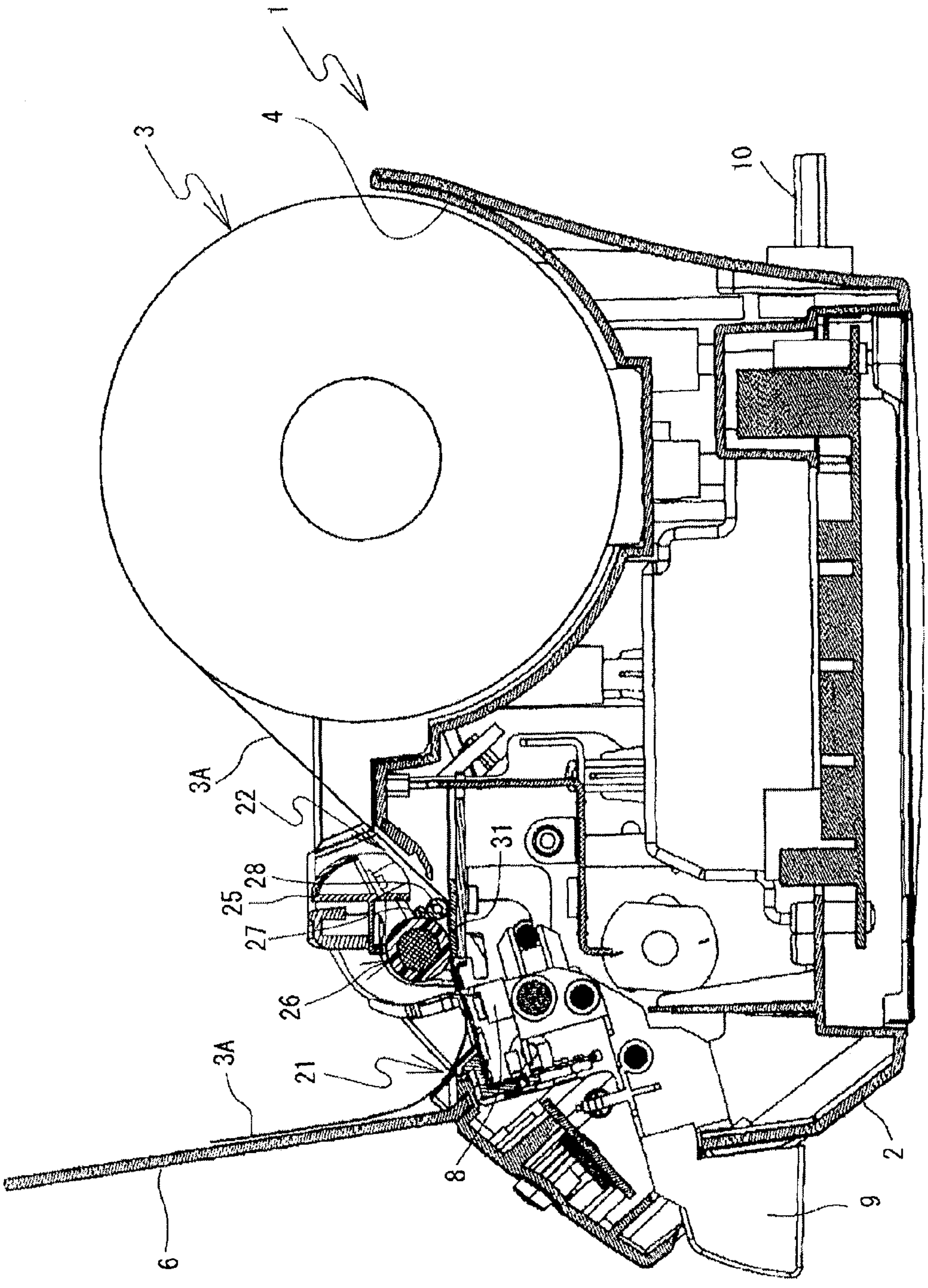
FIG. 2 is a vertical cross-sectional view of the printing device 1.

With reference to FIG. 1 and FIG. 2, a general configuration of a printing device 1 according to the present embodiment will be explained. In the explanation below, an upper right side, a lower left side, a lower right side, an upper left side, an upper side and a lower side are respectively defined as a rear side, a front side, a right side, a left side, an upper side and a lower side of the printing device 1. It should be noted that although FIG. 2 shows a vertical cross-sectional diagram of the printing device 1 with a cover 5 in a closed position, an illustration of the cover 5 is omitted therein.

As shown in FIG. 1, the printing device 1 is a device that is configured to print various characters (letters, numbers, symbols, graphics etc.) on a long roll sheet 3A. The printing device 1 has a rectangular parallelepiped shape with an upper surface of the cover 5 having a round shape like an arc. The printing device 1 includes a case 2 that forms a main body of the printing device 1 and the cover 5 that is rotatably supported by a shaft at a rear section of the case 2 and that can cover a part of an upper surface of the case 2. A cut lever 9 is provided on a front side of the case 2, the cut lever 9 being able to move in the left-right direction. The cut lever 9 is connected to a cutter unit 8 (refer to FIG. 2). When a user moves the cut lever 9 in the left-right direction, the cutter unit 8 moves in the left-right direction and cuts the roll sheet 3A after printing is performed thereon. An operation portion 7 that includes various input buttons such as a power button and the like is provided on an upper surface of a front end section of the case 2. A tray 6 that is made of a plate-shaped transparent resin extends upwardly on a rear side of the operation portion 7. When the cover 5 is closed, a discharge outlet 21 (refer to FIG. 2) that is long in the left-right direction is formed by a front end section of the cover 5 and the case 2 on a rear side of the tray 6. The tray 6 may receive the roll sheet 3A that is discharged from the discharge outlet 21 after the printing.

A connector, to which a power cord 10 (refer to FIG. 2) is connected, is provided closer to one side of a back section of the case 2. In addition, although not shown in the drawings, a universal serial bus (USB) connector, to which a USB cable may be connected, and a local area network (LAN) connector, to which a LAN cable may be connected, are also provided in the back section of the case 2. An external device such as a personal computer (not shown in the drawings and hereinafter referred to as a PC) and the like can be connected to the printing device 1 via the USB connector or the LAN connector.

A sheet storage portion 4 is provided in a rear section inside the case 2. The sheet storage portion 4 is indented downwardly while forming an arc-shape in a side view (refer to FIG. 2). A sheet holder 3, on which the roll sheet (hereafter simply referred to as sheet) 3A is wound, may be stored in the sheet storage portion 4, an axis line of the sheet holder 3 extending in the left-right direction. The sheet 3A may be, for example, formed of a self-coloring long heat-sensitive sheet (a so-called thermal paper), a long label sheet in which a release paper is affixed via an adhesive to one side of the heat sensitive sheet, or the like. The sheet 3A is wound onto a tape spool (not shown in the drawings) with a surface on which the printing is performed facing inward. The tape spool of the sheet 3A may be rotatably supported by support portions 41 that are arranged in a standing condition at right and left sections of the sheet storage portion 4. The sheet holder 3 may be attached to and removed from the sheet storage portion 4 when the cover 5 is in the open position.

In the case 2, a lever 11 is provided in a left front section of the sheet storage portion 4. On a right side of the lever 11, a roller holder 25 is provided that is long in the left-right direction. As shown in FIG. 2, the roller holder 25 holds a platen roller 26, a connection roller 27 and a feed roller 28 in a rotatable manner with an axis direction extending in the left-right direction. Below the roller holder 25, a plate-shaped thermal head 31 is arranged facing the platen roller 26 and the feed roller 28. The roller holder 25 may move in the up-down direction around a point of support at a rear end thereof in conjunction with a circular movement of the lever 11 in the up-down direction.

The lever 11 is constantly urged in the upward direction by a coiled spring (not shown in the drawings), but when the cover 5 is closed, the lever 11 moves circularly downward, resisting the urging force of the coiled spring. As a result, the roller holder 25 moves downward and the platen roller 26 and the feed roller 28 press the sheet 3A toward the thermal head 31. In this case, the printing device 1 is in a state in which the printing is possible. On the contrary, when the cover 5 is opened, the lever 11 moves circularly upward. As a result, the roller holder moves upward and the platen roller 26 and the feed roller 28 are separated from the thermal head 31 and the sheet 3A. In this case, the printing device 1 is in a state in which the printing is not possible.

As shown in FIG. 2, a feed path 22 of the sheet 3A is provided extending from a front side (the left side in FIG. 2) of the sheet storage portion 4 in a forward and diagonally downward direction (in a leftward and diagonally downward direction in FIG. 2). The feed path 22 passes between the feed roller 28 and the thermal head 31 and between the platen roller 26 and the thermal head 31 and extends as far as the discharge outlet 21 that is provided on an upper surface of the printing device 1. It should be noted that although the discharge outlet 21 is formed by the front end section of the cover 5 and the case 2, in FIG. 2, a part in which the discharge outlet 21 is formed in the case 2 is illustrated, since illustration of the cover 5 is omitted in the drawing.

In the present embodiment, the printing is performed while the sheet 3A is fed from the sheet storage portion 4 to the discharge outlet 21 along the feed path 22. In the explanation below, a direction in which the sheet 3A is fed along the feed path 22 is called a feed direction of the sheet 3A. With respect to the feed path 22, a side of the sheet storage portion 4 is called an upstream side in the feed direction, and a side of the discharge outlet 21 is called a downstream side in the feed direction. Normally, when the printing is performed, the sheet 3A is fed from the upstream side toward the downstream side. When link printing that will be described below is performed, the sheet 3A is temporarily fed from the downstream side toward the upstream side.

As shown in FIG. 2, the platen roller 26, the feed roller 28, the connection roller 27 and the thermal head 31 are located approximately at the center of the feed path 22 in a front-rear direction. The thermal head 31 is provided with a plurality of heating elements (not shown in the drawings) that are arranged in one row in a direction that is orthogonal to the feed direction and in a position facing the platen roller 26. The thermal head 31 performs the printing on the sheet 3A that is sandwiched between the platen roller 26 and the heating elements by using the heating elements. Note that, hereinafter, a position between the platen roller 26 and the heating elements at which the printing is performed is called a print position. The platen roller 26 is urged toward the thermal head 31. The platen roller 26 is connected to a feed motor 209 (refer to FIG. 3) via gears that are not shown in the drawings, and the platen roller 26 rotates as the feed motor 209 is driven.

On a rear side of the platen roller 26, the feed roller 28 is arranged such that it is slightly separated from the platen roller 26. The connection roller 27 is arranged between the platen roller 26 and the feed roller 28. An outer peripheral surface of the connection roller 27 is in contact with an outer peripheral surface of the platen roller 26 and an outer peripheral surface of the feed roller 28. The connection roller 27 may transmit power from the platen roller 26 to the feed roller 28. The feed roller 28 may be rotated in the same direction as the platen roller 26 by the power transmitted from the connection roller 27.

The platen roller 26 and the feed roller 28 may contact a surface on the same side of the sheet 3A (the upper surface in FIG. 2) and they sandwich the sheet 3A with the thermal head 31. The platen roller 26 and the feed roller 28 may feed the sheet 3A in the feed direction (a direction from the upstream side to the downstream side or a direction from the downstream side to the upstream side) by sandwiching the sheet 3A with the thermal head 31 and by rotating in the same direction. Note that, since the printing is performed in the printing device 1 while the sheet 3A is being fed in the feed direction, a direction in which the characters are printed on the sheet 3A (a print direction) is an opposite direction to the feed direction. The printing on the sheet 3A is performed by the thermal head 31 one line at a time, the line corresponding to the row of the heating elements arranged orthogonally to the feed direction.

The cutter unit 8 having a fixed blade and a movable blade is provided between the platen roller 26 and the discharge outlet 21. When the user moves a cutter lever 9 in the left-right direction, the sheet 3A is sandwiched between the fixed blade and the movable blade and is cut.

Figure 3:
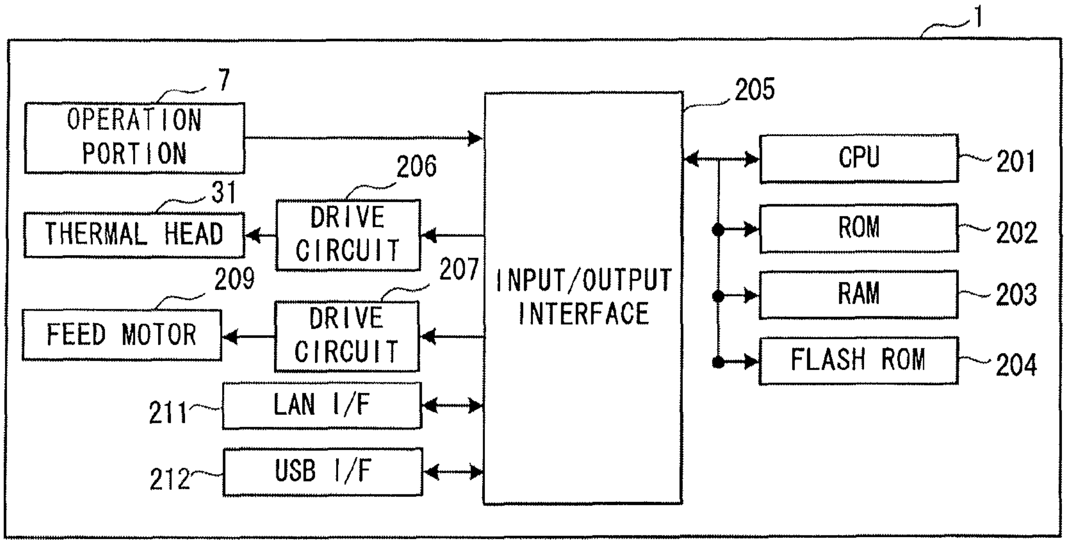
FIG. 3 is a block diagram showing an electrical configuration of the printing device 1.

With reference to FIG. 3, an electrical configuration of the printing device 1 will be explained. As shown in FIG. 3, the printing device 1 includes a CPU 201, a ROM 202, a RAM 203 and a flash ROM 204 that are all mutually connected by a bus. The CPU 201 governs a control of the whole printing device 1. The ROM 202 stores various programs that are necessary for the control of the printing device 1, such as a program for printing processing that will be described below, and control data and the like that are necessary for the above-mentioned programs. The CPU 201 may perform various calculation and control processing in accordance with the programs stored in the ROM 202. In addition, a number of character fonts are stored in the ROM 202.

The RAM 203 may temporarily store various calculation results etc. generated by the CPU 201. Although not shown in the drawings, the RAM 203 may be provided with storage areas, such as a received data storage area in which the print data received from the external device are stored, a print buffer in which printing dot pattern data (hereinafter simply referred to as dot data) are stored when the printing is performed and a work area. The dot data may be developed in the print buffer based on the print data received from the external device and the fonts stored in the ROM 202. The flash ROM 204 is a non-volatile memory and may store various information.

The CPU 201 is connected to an input/output interface 205. The operation portion 7, drive circuits 206 and 207, a LAN interface (I/F) 211 and a USB interface (I/F) 212 are connected to the input/output interface 205. The thermal head 31 (more specifically, the heating elements) that is configured to perform the printing on the sheet 3A is connected to the drive circuit 206. The drive circuit 206 may control a heating mode of the entire thermal head 31 by controlling energization and non-energization of each of the heating elements of the thermal head 31 based on a control signal from the CPU 201. The feed motor 209 that is provided to rotate the platen roller 26 for feeding the sheet 3A (refer to FIG. 2) is connected to the drive circuit 207. The drive circuit 207 may control a drive of the feed motor 209 based on a control signal from the CPU 201.

The LAN connector (not shown in the drawings) is connected to the LAN I/F 211. The USB connector (not shown in the drawings) is connected to the USB I/F 212. The LAN I/F 211 and the USB I/F 212 may send data to and receive data from the external device connected via the respective connectors. The CPU 201 controls the printing in accordance with the print data that are received from the external device via the LAN I/F 211 and the USB I/F 212.

Figure 4:
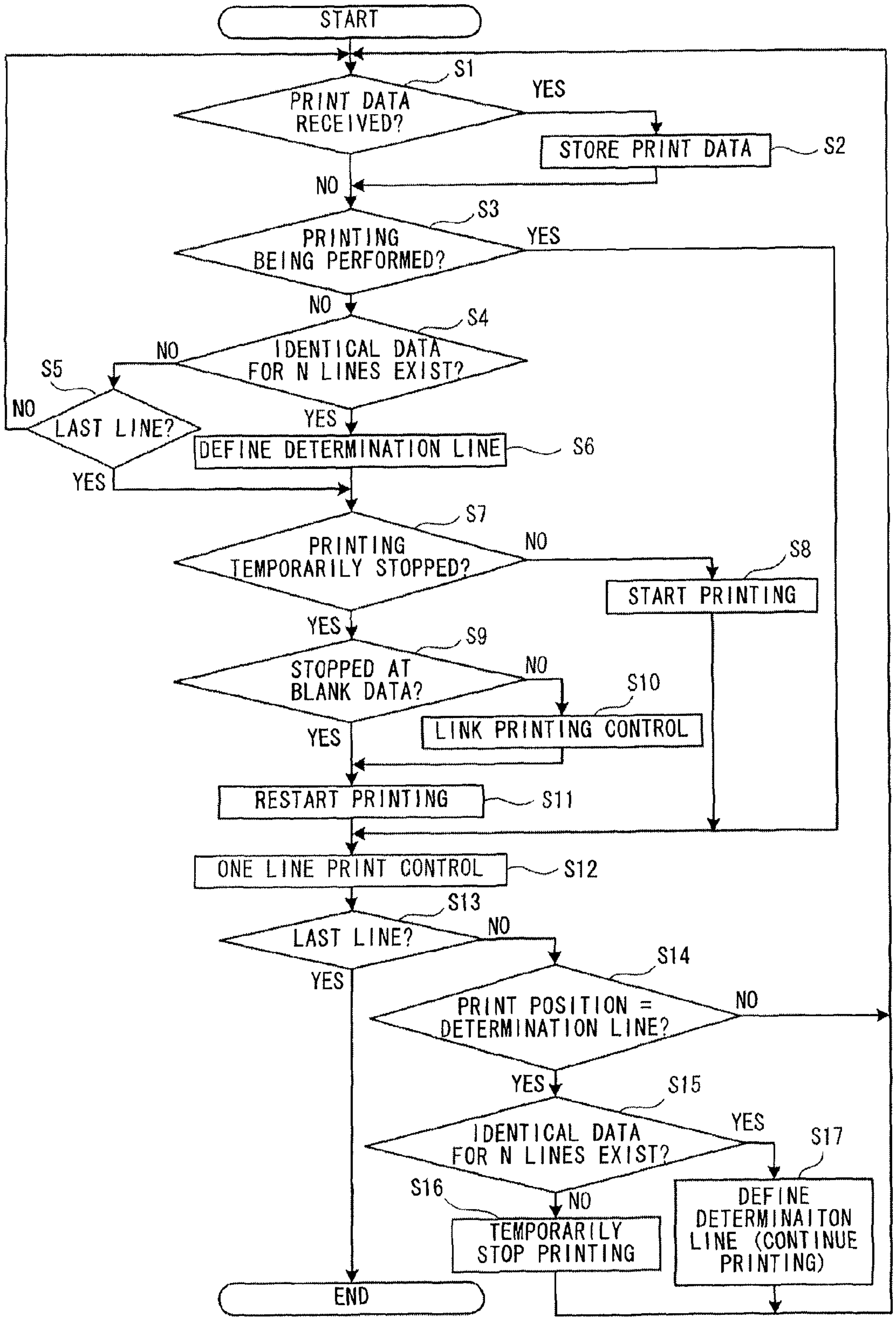
FIG. 4 is a flowchart of printing processing that is performed in the printing device 1.
Figure 5:
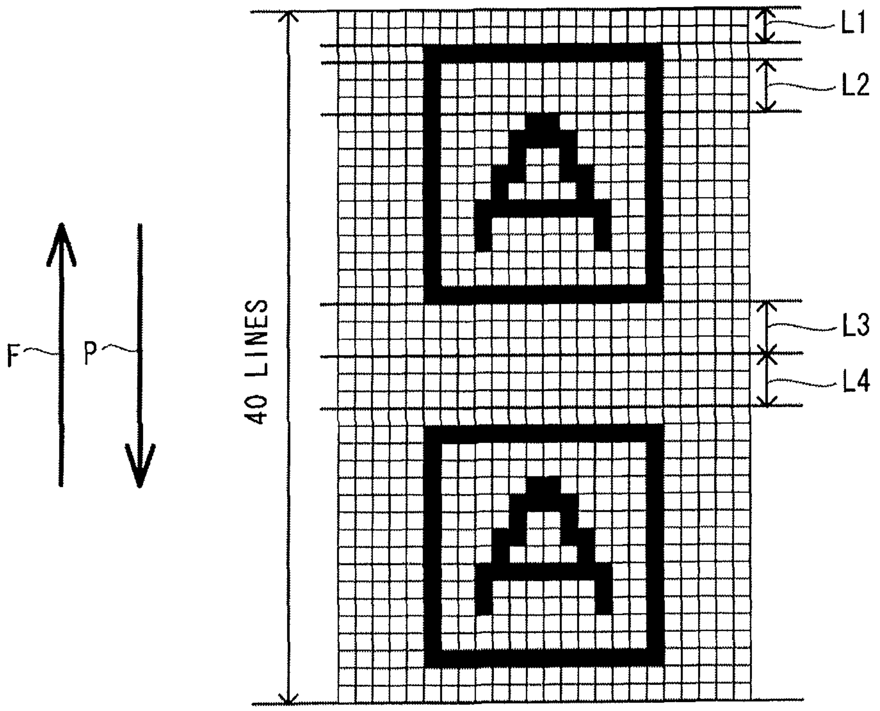
FIG. 5 is an explanatory diagram showing an example of a print object to be printed in the printing processing.

With reference to FIG. 4 and FIG. 5, printing processing that is performed in the printing device 1 of the present embodiment will be explained. In the printing processing of the present embodiment, so-called successive printing is performed in which the printing is sequentially performed on the sheet 3A one line at a time based on the print data received, while at the same time receiving the print data from the external device. During that time, a timing to start the printing and a timing to temporarily stop or continue the printing are determined based on the received print data. The printing processing is started when print data are received from an external device that is connected to the printing device 1 via the LAN I/F 211 or the USB I/F 212. The printing processing is performed by the CPU 201 in accordance with the program stored in the ROM 202.

Note that, in the explanation below regarding the printing processing, as shown in FIG. 5, a specific example is used in which a design with two alphabet letters A arranged therein is used as a print object, the two alphabet letters A each being enclosed by a square frame and being arranged along the print direction (the feed direction) with a blank space therebetween. In addition, to simplify the explanation, an example is used below in which 24 heating elements are arranged in one row in the thermal head 31. In FIG. 5, an arrow F shows a normal feed direction of the sheet 3A at the time of performing the printing, namely, the direction from the upstream side to the downstream side, and an arrow P shows the print direction of the characters that are printed at that time. 24 cells in one row arranged in the left-right direction in the drawing represent dots corresponding to the dot data that are developed from the print data of one line. A black cell corresponds to the heating element that is energized and shows a position in which the dot is formed. A white cell corresponds to the heating element that is not energized and shows a position in which the dot is not formed (namely, a blank cell). The print data of the print object shown in FIG. 5 include the print data for 40 lines from the $1^{st}$ line to the $40^{th}$ line, and the print data of the $40^{th}$ line include information that indicates that it is the print data of the last line. The print data are sent from the external device to the printing device 1 in one-line units.

As shown in FIG. 4, when the printing processing is started, it is determined whether the print data have been received (step S1). First, when the print data of the first one line (the $1^{st}$ line) has been received (YES at step S1), the received print data are stored in the received data storage area of the RAM 203. Further, the print data are converted into the dot data in accordance with the fonts stored in the ROM 202 and the dot data are stored in the print buffer (step S2). At this time, 1 is added to a variable i (an initial value is zero) that is used for counting a line number of the received print data (i.e. a number of the line in the order), and the variable i is stored in the RAM 203. Subsequently, it is determined whether the printing is being performed (step S3). When the printing is started or restarted, a print execution flag is stored in the RAM 203 as ON, as is described in more detail below. Therefore, at step S3, it is determined whether the printing is being performed based on whether or not the print execution flag is ON.

Since the printing has not been started yet in processing of the $1^{st}$ line, the printing is not being performed (NO at step S3). In this case, it is determined whether or not identical print data are accumulated in the received data storage area of the RAM 203 consecutively for a predetermined number n of lines. Specifically, it is determined whether or not identical dot data (hereinafter simply referred to as identical data) are accumulated in the print buffer consecutively for a predetermined number n of lines (step S4). The predetermined number n is an integral number equal to or larger than 1. The predetermined number n may be determined in advance corresponding to an area on which the link printing may be performed, namely, an area in which the printing may be performed again over an already printed section after the printing is stopped. When the printing is performed based on the identical data of the number n of consecutive lines, the section becomes a section with no change, that is, a section in which the identical printing result appears consecutively for the number n of lines in the print direction (the direction from the downstream side toward the upstream side in the feed direction). In other words, even if the link printing is performed in this section, there would be no major impact on print quality. Therefore, in the present embodiment, a control to start the printing is performed, since the printing can be continued without stopping the printing at least up to this section, as long as the identical data of the predetermined number n of the consecutive lines are stored. It is realistically preferable that a number approximately between 40 and 120 is used as the predetermined number n. In the explanation below, however, an example is used in which 3 is set as the predetermined number n, in order to simplify the explanation.

Since the print data for only one line are accumulated in the processing of the $1^{st}$ line, the identical data for 3 lines do not exist (NO at step S4). In this case, it is determined whether or not the print data of the last line (the $40^{th}$ line) has been received (step S5). Since the $1^{st}$ line is not the last line (NO at step S5), the processing returns to step S1. When the print data are not received (NO at step S1), the printing is not being performed (NO at step S3), the identical data for the number n of lines are not accumulated (NO at step S4) and the line is not the last line (NO at step S5), and so the processing returns to step S1 again. When the print data of the next line (the $2^{nd}$ line) are received (YES at step S1), the dot data thereof are stored in the print buffer and 1 is added to the variable i (i=2) (step S2). Since the printing has not been started yet (NO at step S3), it is determined whether the identical data for 3 lines are accumulated (step S4). Both the print data of the $1^{st}$ line and the $2^{nd}$ line shown by lines L1 in FIG. 5 are the print data indicating that all the 24 heating elements are not energized (hereinafter referred to as blank data), so the print data of the $1^{st}$ line and the $2^{nd}$ line are the identical data. However, since the identical data are accumulated for 2 lines only (NO at step S4) and the $2^{nd}$ line is not the last line (NO at step S5), the processing returns to step S1.

Since the identical data do not exist consecutively for 3 lines between the $3^{rd}$ line and the $5^{th}$ line, the processing from step S1 to step S5 is repeated in a similar manner to that described above. As a result, the print data from the $1^{st}$ line to the $5^{th}$ line are accumulated in the print buffer. When the print data of the $6^{th}$ line is received (YES at step S1), since the print data from the $4^{th}$ line to the $6^{th}$ line are the identical data as shown by lines L2 in FIG. 5, it is determined that the identical data for 3 lines are accumulated (YES at step S4). Then, a determination line is defined (step S6). When it is determined at step S4 that the predetermined number n of lines are accumulated, of the number n of lines, a line that is at least one line prior to the last line (the $n^{th}$ line) may be set as the determination line. In the present embodiment, the $(n-1)^{th}$ line of the number n of lines (namely, the $2^{nd}$ line of the 3 consecutive lines of the identical data) is set as the determination line. Therefore, in processing at step S6 that is performed after receiving the print data of the $6^{th}$ line, the $5^{th}$ line is defined as the determination line. The line number of the defined determination line (in this case, the number 5) is stored in the RAM 203.

After the determination line is defined, it is determined whether or not the printing is temporarily stopped (step S7). As will be described in more detail below, when the printing is temporarily stopped, a temporary stop flag is stored in the RAM 203 as ON. Therefore, at step S7, it is determined whether or not the printing is temporarily stopped based on whether the temporary stop flag is ON. In the processing of the $6^{th}$ line, the temporary stop flag has not been set to ON in previous processing (NO at step S7), the printing is started (step S8). At that time, the print execution flag is stored in the RAM 203 as ON.

Subsequently, one line print control processing is performed (step S12). In the one line print control processing, the printing for one line is performed based on the oldest dot data, namely, the dot data with the smallest line number among the dot data stored in the print buffer. More specifically, the drive circuits 206 and 207 are driven by the CPU 201 based on the dot data. Thus, the heating elements of the thermal head 31 corresponding to positions in which the dots are to be formed are energized, and at the same time, the feed motor 209 causes the platen roller 26 to rotate in the direction by which the sheet 3A is fed in the feed direction F. As a result, the printing for one line is performed on the sheet 3A while the sheet 3A is being fed in the feed direction F. After the printing is performed, 1 is added to a variable j (an initial value is zero) that is used for counting the line number of the print data for which the printing has been completed among the received print data, and the updated variable j is stored in the RAM 203. Further, the dot data of the line for which the printing has been completed are deleted from the print buffer.

After the one line print control processing is performed, it is determined whether or not the line that has been printed at step S12 is the last line (step S13). When any print data are still stored in the print buffer, the printing has not yet been performed to the last line (NO at step S13). Then it is determined whether or not a print position is at the determination line (step S14). More specifically, it is determined whether the line number of the line that has been printed at step S12, the line number being indicated by the variable j, is equal to the line number of the determination line that is defined at step S6 and stored in the RAM 203.

In the example shown in FIG. 5, when the printing is started after the print data up to the $6^{th}$ line are received, the line that is initially printed at step S12 is the $1^{st}$ line and is not the $5^{th}$ line that is the determination line (NO at step S14). In this case, the processing returns to step S1. When the print data of the next line (the $7^{th}$ line) is received and the dot data are stored in the print buffer (YES at step S1 and step S2), it is determined that the printing is being performed (YES at step S3) since the print execution flag is already set to ON. In this case, the processing advances to the one line print control processing without any interruption, the printing for the $2^{nd}$ line is performed based on the dot data of the $2^{nd}$ line that is the oldest line of all (step S12) as described above. Since the $2^{nd}$ line is neither the last line (NO at step S13) nor the determination line (NO at step S14), the processing returns to step S1.

When the print data from the external device is being received smoothly, the printing processing is performed in the same manner as described above based on the dot data of the line with the smallest line number stored in the print buffer while at the same time receiving the print data of the next line, the printing processing being repeatedly performed one line at a time (YES at step S1; YES at step S2 and step S3; step S12). On the other hand, when the reception of the print data from the external device is disrupted for some reason, only the printing processing based on the dot data of the line with the smallest line number stored in the print buffer is performed, repeatedly one line at a time (NO at step S1; YES at step S3; step S12). In either case, when the printing of the $5^{th}$ line is performed at step S12, it is determined that the print position is at the $5^{th}$ line that is the determination line (NO at step S13 and YES at step S14).

At this time, the printing device 1 is in a state in which it has completed the printing for 2 lines among the identical data of the consecutive 3 lines (from the $4^{th}$ line to the $6^{th}$ line shown by the lines L2 in FIG. 5) and it is ready to perform the printing for one more line based on the identical data. Therefore, at this point, there would be no significant impact on the print quality, even if the printing is temporarily stopped and the link printing is performed in which the same section is printed again. On the other hand, if the printing is further continued and the printing device 1 fails to receive the print data for some reason in a section in which a different print result appears consecutively for a plurality of lines and if the printing is stopped to perform the link printing at that section, the print quality may deteriorate. Therefore, it is determined whether or not to temporarily stop the printing. More specifically, it is determined whether the dot data stored in the print buffer include the identical data of the 3 consecutive lines (step S15).

In the example shown in FIG. 5, when the reception of the print data from the external device and the printing are performed smoothly one line at a time, the print data up to the $10^{th}$ line have been received by the time that the printing is completed up to the $5^{th}$ line, which is the determination line. Further, if there is any delay in the reception of the print data, the print data is received up to either the $7^{th}$, $8^{th}$ or $9^{th}$ line. In either case, the dot data stored in the print buffer do not include the identical data of the 3 consecutive lines (NO at step S15). In this type of case, even though it is possible that the identical data of the 2 lines are included in the print buffer, the print buffer is substantially in a state in which only dot patterns corresponding to the section in which the different print result appears consecutively are stored. Therefore, since the print quality may deteriorate when the printing is continued at this point as described above, it is determined to temporarily stop the printing (step S16). At that time, the temporary stop flag of the RAM 203 is set to ON while the print execution flag is set to OFF. Then, the processing returns to step S1.

After that, since the printing is temporarily stopped (NO at step S3), the processing (steps from S1 to S5) is repeated in which the print data are received and the dot data are stored in the print buffer until the identical data of the 3 consecutive lines are once more accumulated in the print buffer (YES at step S4) or the print data of the last line is received (YES at step S5). In the example shown in FIG. 5, since the print data from the $18^{th}$ line to the $20^{th}$ line are the identical data, as shown by lines L3 in FIG. 5, when the dot data of the $20^{th}$ line are stored in the print buffer, it is determined that the identical data of the 3 consecutive lines are accumulated (YES at step S4) and the $19^{th}$ line is defined as the next determination line (step S6). Since the temporary stop flag is ON (YES at step S7), it is determined whether or not the print position at the time of the temporary stop is a line that corresponds to the blank data (hereinafter referred to as a blank line) (step S9).

As described above, when the printing is stopped at the $5^{th}$ line in the example shown in FIG. 5, the $6^{th}$ line that is the oldest among the dot data stored in the print buffer is not the blank data. In other words, the printing is temporarily stopped at a line that is not the blank line (NO at step S9). In this case, control processing for the link printing (hereinafter referred to as link control processing) is performed (step S10). In the link control processing, the drive circuit 207 is driven by the CPU 201, and the feed motor 209 causes the platen roller 26 to rotate in the direction by which the sheet 3A is fed in the opposite direction to the feed direction F (the direction from the downstream side toward the upstream side). At this time, the drive of the feed motor 209 is controlled such that the print position of the sheet 3A overlaps with at least the last line of the lines printed on the sheet 3A before the printing is temporarily stopped, the sheet 3A being fed in the opposite direction to the feed direction F. In other words, the sheet 3A is moved back to a position at which a section printed immediately before the printing is temporarily stopped can be reprinted when the printing is restarted.

Subsequently, in order to restart the printing, after the print execution flag of the RAM 203 is set to ON and the temporary stop flag is set to OFF (step S11), the one line print control processing is performed (step S12) based on the dot pattern of the $6^{th}$ line. Since the dot data up to the $20^{th}$ line are already stored in the print buffer at this time, the printing is performed one line at a time without any stop in the middle of the printing, as described above, from the $6^{th}$ line to the $19^{th}$ line, which is the next determination line.

Since lines from the $21^{st}$ to the $23^{rd}$ line, as shown by lines L4 in FIG. 5, are all the blank lines, if the print data up to at least the $23^{rd}$ line have been received when the printing of the $19^{th}$ line is completed, it is determined that the identical data of the 3 consecutive lines are accumulated in the print buffer (YES at step S14 and YES at step S15). In this case, since it is possible to perform the printing up to the $23^{rd}$ line, there would be no risk that the printing will be stopped in the middle at the section in which the different print result appears consecutively. Therefore, in this case, it is determined that the printing should be continued, and after the $22^{nd}$ line, which is the second line among the lines from the $21^{st}$ to the $23^{rd}$ lines, is defined as the next determination line (step S17), the processing returns to step S1. If the print data up to the $23^{rd}$ line are not received when the printing of the $19^{th}$ line is completed (NO at step S15), the processing returns to step S1 after the printing is temporarily stopped (step S16).

After that, the same processing as described above is repeated, and the printing is performed up to the $22^{nd}$ line. The identical data of the 3 consecutive lines do not exist from the $23^{rd}$ line to the $40^{th}$ line, which is the last line. Therefore, at a time when the printing of the $22^{nd}$ line is completed, regardless of up to which line the print data have been received, the printing is temporarily stopped (S16) since the identical data of the 3 consecutive lines do not exist (NO at step S15). After that, until the print data of the $40^{th}$ line are received, the $40^{th}$ line being the last line, the processing from step S1 to step S5 is repeated. Then, when the print data of the $40^{th}$ line are received (YES at step S5), the printing is restarted without causing the link printing to be performed (step S11) since the printing is being temporarily stopped (YES at step S7) and the $23^{rd}$ line is the blank line (YES at step S9). Then, the printing is performed one line at a time based on the dot data of the lines from the $23^{rd}$ line to the $40^{th}$ line, the dot data stored in the print buffer, and the printing processing shown in FIG. 4 is terminated when the printing of the $40^{th}$ line is complete, the $40^{th}$ line being the last line (YES at step S13).

As described above, in the printing device 1 of the present embodiment, when the dot data corresponding to the identical print data of the predetermined number of consecutive lines (the identical data) received from the external device are accumulated in the print buffer, the printing based on the print data accumulated in the print buffer is started. Therefore, the printing device 1 can perform the printing without any interruption at least up to the section corresponding to the identical data of the predetermined number of lines. Among the print data, a print section based on the identical data of the predetermined number of lines is a section in which the identical print result appears consecutively for the predetermined number of lines. In other words, even when the link printing is performed in this section, there would be no significant impact on the print quality. Therefore, even when the printing is stopped due to a lack of print data for printing as a result of a disruption in the reception of the print data from the external device for some reason, it is possible to inhibit the print quality from deteriorating.

Further, in the printing device 1 of the present embodiment, in a case where the identical data of the predetermined number of lines are not newly accumulated in the print buffer before the printing that is currently performed based on the identical data of the predetermined number of lines is complete, the printing is temporarily stopped when the printing that is currently performed based on the identical data is complete. On the other hand, in a case where the identical data of the predetermined number of lines are newly accumulated, the printing is continued based on the dot data that have been converted form the print data received from the external device after the printing is started and stored in the print buffer. Therefore, the printing does not stop at a section of the dot data that are not the identical data. Hence, it is possible to reliably inhibit the print quality from deteriorating and to continue the printing efficiently.

Further, in the printing device 1 of the present embodiment, when the identical data of the predetermined number of lines are newly accumulated in the print buffer after the printing is temporarily stopped, the printing is restarted based on the dot data stored in the print buffer. In this case, even when the printing is interrupted by the temporary stop, it is possible to restart the printing when a state is achieved in which the deterioration of the print quality can be inhibited.

The present invention is not limited to the above-described embodiment, and various changes and modifications can be made thereto. For example, as described above, the predetermined number n, which is used to determine whether the printing should be started and whether the printing should be temporarily stopped or continued, need not necessarily be 3.

In the above-described embodiment, the $(n-1)^{th}$ line is used as the determination line among the number n of lines when it is determined that the identical data of the predetermined number n of lines are accumulated. However, the determination line may be any line that is at least one line prior to the last line (the $n^{th}$ line) and may be a line other than the $(n-1)^{th}$ line, such as the $(n-2)^{th}$ line, the $(n-3)^{th}$ line and the like.

In the above-described embodiment, in a case where the identical data of the predetermined number n of consecutive lines are accumulated in the print buffer when the printing of the determination line is complete, the printing is continued, and in a case where the identical data are not accumulated, the printing is temporarily stopped. However, the printing may be always temporarily stopped when the printing of the determination line is complete. Subsequently, it may be determined whether the identical data of the predetermined number n of consecutive lines are accumulated in the print buffer. Then the printing may be restarted when it is determined that the identical data of the predetermined number n of consecutive lines are accumulated in the print buffer.

In the above-described embodiment, the link printing is performed or not performed depending on whether or not the identical data of the predetermined number n of consecutive lines are the blank data. However, the link printing may be always performed regardless of whether the identical data are the blank data. On the other hand, the printing may be started, restarted or continued only when the identical data of the predetermined number n of consecutive lines are the blank data. In the latter case, even when the print data are not received after that, it is always possible to perform the printing processing up to the blank lines for the predetermined number n of lines corresponding to the blank data. Hence, when the printing is stopped at a blank line, even if the printing is restarted without performing the link printing, there would be no impact on the print quality. Therefore, it is possible to simplify the processing at the time of restarting the printing and to restart the printing promptly.

In the above-described embodiment, although the print data transmitted from the external device are converted into the dot data in the printing device 1, the dot data of each line may be initially transmitted from the external device.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A printing device that is connectable to an external device, the printing device comprising:

a feeding portion that is configured to feed a print medium along a feed direction;

a printing portion that is configured to perform printing on the print medium that is fed by the feeding portion, the printing being performed for each of a print line extending in a direction orthogonal to the feed direction;

a storage portion that is configured to sequentially store print data received from the external device; and a processor that is configured to determine whether a first set of consecutive identical data being identical print data for a predetermined number of the print lines consecutive in the feed direction is accumulated in the storage portion;

cause the printing portion to start the printing based on the print data stored in the storage portion when it is determined that the first set of consecutive identical data are accumulated, determine whether a second set of consecutive identical data is accumulated in the storage portion before completion of the printing based on the first set of consecutive identical data that is included in the print data, cause the printing portion to stop printing at a time point at which the printing based on the first set of consecutive identical data is complete when it is determined that the second set of consecutive identical data is not accumulated, and cause the printing portion to continue the printing based on the print data stored in the storage portion even after the printing based on the first set of consecutive identical data is complete when it is determined that the second set of consecutive identical data is accumulated.

2. The printing device according to claim 1, wherein the processor is further configured to determine whether the second set of consecutive identical data is accumulated in the storage portion after the printing is stopped, and cause the printing portion to restart the printing based on the print data stored in the storage portion when it is determined that the second set of consecutive identical data is accumulated after the printing is stopped.

3. The printing device according to claim 1, wherein the first set or the second set of consecutive identical data are blank data for the predetermined number of print lines.

4. A non-transitory computer readable medium storing a printing control program, the printing control program comprising computer readable instructions that, when executed, cause a processor of a printing device that is connectable to an external device to perform the steps of:

determining whether a first set of consecutive identical data being identical print data for a predetermined number of the print lines consecutive in the feed direction is accumulated in a storage portion that is adapted to sequentially store print data received from the external device, the feed direction being a direction in which a print medium is fed by a feeding portion of the printing device, the print line being a unit in which printing is performed by a printing portion of the printing device on the print medium that is fed by the feeding portion and the print line extending in a direction orthogonal to the feed direction;

causing the printing portion to start the printing based on the print data stored in the storage portion when it is determined that the first set of consecutive identical data is accumulated;

determining whether a second set of consecutive identical data is accumulated in the storage portion before completion of the printing based on the first set of consecutive identical data that is included in the print data;

causing the printing portion to stop the printing at a time point at which the printing based on the first set of consecutive identical data is complete, when it is determined that the second set of consecutive identical data is not accumulated; and causing the printing portion to continue the printing based on the print data stored in the storage portion even after the printing based on the first set of consecutive identical data is complete, when it is determined that the second set of consecutive identical data is accumulated.

5. The non-transitory computer readable medium according to claim 4, wherein the printing control program further includes computer readable instructions to cause the control portion to perform the steps of:

determining whether the second set of consecutive identical data is accumulated in the storage portion after the printing is stopped; and causing the printing portion to restart the printing based on the print data stored in the storage portion, when it is determined that the second set of consecutive identical data is accumulated after the printing is stopped.

6. The non-transitory computer readable medium according to claim 4, wherein the first set or the second set of consecutive identical data are blank data for the predetermined number of print lines.

* * * * *